United States Patent [19]

Herzig et al.

[11] Patent Number: 5,474,709
[45] Date of Patent: Dec. 12, 1995

[54] PROCESS FOR DEFOAMING AND/OR DEGASSING ORGANIC SYSTEMS

[75] Inventors: Christian Herzig, Taching; Willibald Burger, Burghausen; Ernst Innertsberger, Burghausen; Peter Huber, Burghausen; Martina Blöchl, Tann, all of Germany

[73] Assignee: Wacker-Chemie GmbH, Munich, Germany

[21] Appl. No.: 975,942

[22] PCT Filed: Oct. 4, 1991

[86] PCT No.: PCT/EP91/01896

§ 371 Date: Feb. 24, 1993

§ 102(e) Date: Feb. 24, 1993

[87] PCT Pub. No.: WO92/05854

PCT Pub. Date: Apr. 16, 1992

[30] Foreign Application Priority Data

Oct. 9, 1990 [DE] Germany ............... 40 32 006.5

[51] Int. Cl.⁶ ............... B01D 19/04; C08G 77/38; C08G 77/46
[52] U.S. Cl. ............... 252/321; 252/358; 44/320
[58] Field of Search ............... 252/321, 358; 44/320

[56] References Cited

U.S. PATENT DOCUMENTS

| | | | |
|---|---|---|---|
| 2,823,218 | 2/1958 | Speier et al. | 556/415 |
| 4,690,688 | 9/1987 | Adams et al. | 44/320 |
| 4,906,403 | 3/1990 | Berger et al. | 252/321 |
| 4,919,843 | 4/1990 | Innertsberger et al. | 252/358 |
| 5,008,103 | 4/1991 | Raleigh et al. | 424/65 |
| 5,041,594 | 8/1991 | Herzig et al. | 556/450 |
| 5,113,006 | 5/1992 | Herzig | 556/453 |
| 5,166,295 | 11/1992 | Herzig | 528/15 |
| 5,214,077 | 5/1993 | Herzig et al. | 522/99 |
| 5,250,647 | 10/1993 | Herzig | 528/15 |
| 5,331,020 | 7/1994 | Brown et al. | 522/99 |

FOREIGN PATENT DOCUMENTS

| | | |
|---|---|---|
| 424960 | 5/1991 | European Pat. Off. . |
| 2579481 | 10/1986 | France . |
| 255737 | 4/1988 | German Dem. Rep. . |
| 2173510 | 6/1989 | United Kingdom . |

*Primary Examiner*—Richard D. Lovering
*Assistant Examiner*—Daniel S. Metzmaier
*Attorney, Agent, or Firm*—Martin Connaughton

[57] ABSTRACT

A process for defoaming and/or degassing organic systems by addition of an organopolysiloxane-containing anti-foaming agent to the organic system is characterized by the fact that the organopolysiloxane used is one composed of siloxane units having the general formulae (I) and (II), in which R is a univalent hydrocarbon residue with 1 to 18 carbon atoms per residue; A is a residue having the general formula (a), in which $R^1$ is a residue having the formula —$CR^3H$—, where $R^3$ stands for a hydrogen atom or a univalent organic residue; $R^2$ is a residue having the formulae —$CR^4H$—$CH_2$— or —$CH_2CH_2CH_2$— where $R^4$ stands for a hydrogen atom or a univalent organic residue; v and w represent each 0 or an integer, the sum of v+w being in average 0 to 16; x and y represent each 0 or 1, the sum x+y being 1 or 2; a equals 1,2 or 3; b equals 0, 1 or 2 and c equals 1 or 2, the sum b+c not exceeding 3.

9 Claims, No Drawings

PROCESS FOR DEFOAMING AND/OR DEGASSING ORGANIC SYSTEMS

The invention relates to a process for defoaming and/or degassing organic systems, the term organic systems also being intended to comprise those systems which are not entirely but only predominantly composed of organic compounds.

The use of a polydiene modified with organopolysiloxane groups as defoaming and/or aerating agent for organic systems is described in U.S. Pat. No. 4,906,403, in which polydiene the organopolysiloxane groups have organic radicals bonded via oxygen to silicon. The susceptibility to hydrolysis caused by this is found to be disadvantageous, especially in the case of organic systems which have a certain water content, such as, for example, crude petroleum.

A process for controlling foaming in liquid hydrocarbon fuels by adding a polysiloxane/polyoxyalkylene copolymer to the hydrocarbon fuel is described in GB-A 2 173 510, only those polysiloxane/polyoxyalkylene copolymers in which the proportion of oxyalkylene groups makes up 25 to 65 percent by weight of the calculated molecular weight of the copolymer being effective.

DD-A 255 737 (published on Apr. 13, 1988, G. Sonnek et al., Academy of Sciences of the German Democratic Republic) discloses siloxanylalkenediyl-bis-ω-hydroxy-polyoxyalkylenes of the general formula

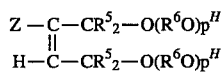

in which Z denotes an organosilyl, organosiloxanyl or polyorganosiloxanyl radical,
$R^5$ denotes hydrogen or a short-chain alkyl radical,
$R^6$ denotes a —$CH_2$—$CH_2$— or —$CH(CH_3)$—$CH_2$— group and
p denotes an integer from 1 to 50, and their use as surfactants.

When liquid hydrocarbons, such as liquid hydrocarbon fuels, are transferred from one container into another container by pumping, in the presence of air and optionally of water, for example when rapidly feeding diesel fuel from a tanker into a storage tank at a garage, a foam, which in some cases is strong and stable, forms on the surface of the liquid hydrocarbon fuel, which foam prevents rapid feeding of the liquid hydrocarbon fuel into the container and also makes it more difficult to determine the true height of the liquid surface.

Foaming also occurs when working up crude oil by distillation or in cracking processes in the refinery. In addition, foaming also occurs if crude petroleum or crude oil is delivered from a deposit under high deposit pressure and low-boiling hydrocarbons escape from the crude oil on letting down the pressure after delivery.

In addition, the lamellar foaming and the formation of small, spherical, widely separated gas bubbles (so-called microfoams) occur in the case of lubricants and hydraulic oils and also in paints and varnishes.

The aim was, therefore, to provide organopolysiloxanes which can be used for defoaming and/or degassing organic systems.

The invention relates to a process for defoaming and/or degassing organic systems by adding an organopolysiloxane-containing antifoam to the organic system, wherein the organopolysiloxane used is an organopolysiloxane composed of siloxane units of the general formula

and

in which R denotes a monovalent hydrocarbon radical having 1 to 18 carbon atoms per radical, A denotes a radical of the general formula

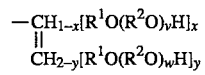

in which
$R^1$ denotes a radical of the formula —$CR^3H$—, where $R^3$ is a hydrogen atom or a monovalent organic radical,
$R^2$ denotes a radical of the formula, —$CR^4H$—$CH_2$— or —$CH_2CH_2CH_2$—, where $R^4$ is a hydrogen atom or a monovalent organic radical,
v and w are each 0 or an integer, the sum of v+w being on average 0 to 16, and
x and y are each 0 or 1, the sum of x+y being 1 or 2,
a is 1, 2 or 3,
b is 0, 1 or 2 and
c is 1 or 2,
the sum of b+c not being greater than 3.

Organopolysiloxanes preferably used in the process according to the invention are those in which the $R^2O$ groups make up 0 or less than 30 percent by weight, in particular 0 to 25 percent by weight of the calculated molecular weight of the organopolysiloxane.

Organopolysiloxanes preferably used in the process according to the invention are those in which the sum of v+w is 0 to 8, particularly preferentially 0 to 4.

Preferably, the organopolysiloxanes according to the invention have a viscosity of 50 to 500,000 $mm^2/s$, particularly preferentially of 200 to 150,000 $mm^2/s$ and in particular of 300 to 20,000 $mm^2/s$, in each case based on a temperature of 25° C.

Organopolysiloxanes preferably used in the process according to the invention are those of the general formula

in which R and A have the meaning indicated above for these radicals and the ratio of m:n is preferably in the range from 1:1 to 25:1 and particularly preferentially in the range from 1:1 to 10:1.

The sum of m+n is preferably between 3 and 1,000, particularly preferentially between 10 and 200.

Examples of radical R are alkyl radicals, such as the methyl, ethyl, n-propyl, isopropyl, n-butyl, isobutyl, tert-butyl, n-pentyl, isopentyl, neopentyl and tert-pentyl radical, hexyl radicals, such as the n-hexyl radical, heptyl radicals, such as the n-heptyl radical, octyl radicals, such as the n-octyl radical and isooctyl radicals, such as the 2,2,4-trimethylpentyl radical, nonyl radicals, such as the n-nonyl radical, decyl radicals, such as the n-decyl radical, dodecyl radicals, such as the n-dodecyl radical, or octadecyl radicals, such as the n-octadecyl radical; alkenyl radicals, such as the vinyl radical and the allyl radical; cycloalkyl radicals, such as cyclopentyl, cyclohexyl or cycloheptyl radicals and methylcyclohexyl radicals; aryl radicals, such as the phenyl, naphthyl and anthryl and phenanthryl radical; alkaryl radicals, such as o-, m- and p-tolyl radicals, xylyl and ethylphenyl radicals; and aralkyl radicals, such as the benzyl radical and the alpha- and β-phenylethyl radical.

Just because of their easier accessibility, preferably at least 50%, in particular at least 90%, of the number of radicals R in the organopolysiloxanes used according to the invention are methyl radicals.

The radical $R^3$ is preferably a hydrogen atom or an alkyl radical having 1 to 6 carbon atoms, particularly preferentially a hydrogen atom.

The radical $R^4$ is preferably a hydrogen atom or an alkyl radical having 1 to 6 carbon atoms, particularly preferentially a hydrogen atom.

A preferred radical $R^1$ is the radical of the formula —$CH_2$—.

A preferred radical $R^2$ is the radical of the formula —$CH_2CH_2$—.

The value of c is preferably 1.

The invention also relates to a process for the preparation of the organopolysiloxanes used according to the invention, which comprises reacting an organic compound (1) of the general formula

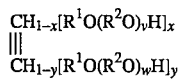

in which $R^1$, $R^2$, v, w, x and y have the meaning indicated above for these, with an organopolysiloxane (2) which has at least one Si-bonded hydrogen atom per molecule, in amounts of from 1.03 to 2.0 mol of organic compound (1) per gram atom of Si-bonded hydrogen in the organopolysiloxane (2), in the presence of a catalyst (3) which promotes the addition of Si-bonded hydrogen to an aliphatic multiple bond.

Preferably, the organic compound (1) is used with organopolysiloxane (2) having at least one Si-bonded hydrogen atom per molecule in amounts of from 1.03 to 1.10 mol per gram atom of Si-bonded hydrogen in the organopolysiloxane (2).

The organic compound (1) used in the process for the preparation of the organopolysiloxanes used according to the invention is preferably prepared by reacting a hydroxyalkyne compound of the general formula

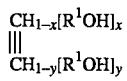

in which $R^1$, x and y have the meaning indicated above for these, with an alkylene oxide in the presence of an electrophilic catalyst, as described in DD-A 255 737.

The organopolysiloxane (2) having at least one Si-bonded hydrogen atom per molecule which is used in the process for the preparation of the organopolysiloxanes used according to the invention is preferably an organopolysiloxane (2) composed of siloxane units of the general formula

and

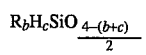

in which R, a, b and c have the meaning indicated above for these.

The preferred organopolysiloxane (2) is an organopolysiloxane (2) of the general formula

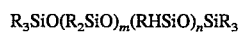

in which R, n and m have the meaning indicated above for these.

The viscosity of the organopolysiloxanes (2) is preferably from 1 to 10,000mm$^2$/s, particularly preferentially from 5 to 250 mm$^2$/s, in each case based on a temperature of 25° C.

Preferred examples of organopolysiloxanes (2) are copolymers composed of trimethylsiloxane, dimethylsiloxane and methylhydrogensiloxane units.

Processes for the preparation of organopolysiloxanes (2) which have at least one Si-bonded hydrogen atom per molecule, including those of the preferred type, are known.

The catalysts (3) promoting the addition of Si-bonded hydrogen to an aliphatic multiple bond which can be used in the process for the preparation of the organopolysiloxanes used according to the invention are the same catalysts which it has also been possible to use hitherto to promote the addition of Si-bonded hydrogen to an aliphatic multiple bond. The catalysts (3) are preferably a metal from the group comprising the platinum metals or a compound or a complex from the group comprising the platinum metals. Examples of such catalysts are metallic and finely divided platinum, which can be present on supports, such as silicon dioxide, aluminum oxide or active charcoal, platinum compounds or complexes, such as platinum halide, for example $PtCl_4$, $H_2PtCl_6 \cdot 6H_2O$, $Na_2PtCl_4 \cdot 4H_2O$, platinum-olefin complexes, platinum-alcohol complexes, platinum-alcoholate complexes, platinum-ether complexes, platinum-aldehyde complexes and platinum-ketone complexes, including reaction products of $H_2PtCl_6 \cdot 6H_2O$ and cyclohexanone, platinum-vinylsiloxane complexes, such as platinum-1,3-divinyl-1,1,3,3-tetramethyldisiloxane complexes with or without a detectable inorganically bonded halogen content, bis-(gamma-picoline)-platinum dichloride, trimethylenedipyridine-platinum dichloride, dicyclopentadiene-platinum dichloride, dimethyl sulfoxide-ethylene-platinum (II) dichloride and reaction products of platinum tetrachloride with an olefin and primary amine or secondary amine or primary and secondary amine in accordance with U.S. Pat. No. 4,292,434, such as the reaction product obtained from platinum tetrachloride dissolved in 1-octene with sec.-butylamine, or ammonium-platinum complexes in accordance with EP-B 110 370.

The catalyst (3) is preferably used in amounts of from 1 to 1,000 ppm by weight (parts by weight per million parts by weight), preferably in amounts of from 5 to 50 ppm by weight, in each case calculated as elementary platinum and based on the total weight of organic compound (1) and organopolysiloxane (2).

If x or y is 1, that is to say if, for example, an organic compound (1) of the formula

is used in the process for the preparation of the organopolysiloxanes used according to the invention, the following isomeric radicals A,

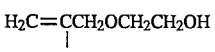

are formed on reaction with the organopolysiloxane (2) having at least one Si-bonded hydrogen atom per molecule.

The reaction of the organic compound (1) with the organopolysiloxane (2) is preferably carried out under the pressure of the ambient atmosphere, that is to say at about 1020 hPa (abs.), but can also be carried out under higher or lower pressures. In addition, the reaction is preferably carried out at a temperature of from 80° C. to 140° C., particularly preferably from 110° C. to 140° C.

In the process for the preparation of the organopolysiloxanes used according to the invention, organic solvents are preferably co-used in amounts of from 0 to 90 percent by weight, with respect to the total weight of the organic compound (1) and organopolysiloxane (2). Examples of organic solvents are toluene, xylene, ethylbenzene, dioxane, 1,2-dimethoxyethane, butyl acetate, ethyl butyrate, methyl isobutyl ketone, cyclohexanone, diethylene glycol dimethyl ether and butyrolactone.

Examples of organic systems are liquid hydrocarbons or compositions containing liquid hydrocarbons, and also paints and varnishes, which contain synthetic resins, such as, for example, polyvinyl chloride, copolymers of vinyl chloride, vinyl acetate and maleic acid, polyesters, acid-curing combinations of alkyd resins, melamine resins and nitrocellulose, dissolved in solvents.

In the case of the process according to the invention, the organic systems are preferably less polar organic systems, particularly preferentially liquid hydrocarbons or compositions containing liquid hydrocarbons, in particular hydrocarbon fuels, preferred hydrocarbon fuels being diesel fuels, jet fuels and crude oil.

The term diesel fuels is understood to mean gas oils and propellant oils and preferably those diesel fuels which are used, for example, for motor vehicles, such as cars and lorries, or for ships. Diesel fuels also include light domestic and heating oils, as is used for heating. These materials generally have a viscosity of at most 28 mm$^2$.s$^{-1}$ at 38° C. and a boiling point in the range from 100° to 380° C. In particular, such fuels have a viscosity of from 2 to 8mm$^2$.s$^{-1}$ at 20° C., a carbon residue (by the Conradson method) of less than 0.10% by weight, a water content of less than 0.05% by weight, a sulfur content of less than 0.30% by weight and a calorific value of about 10,000 to 10,400 kJ/kg.

The term jet fuels is understood to mean kerosene, light oils and middle oils, which have a boiling range between 150° and 300° C.

The process according to the invention can also be used to control foaming in other liquid hydrocarbon fuels, such as, for example, residue oils which have a boiling point higher than 380° C., light, middle and heavy naphthas and gasolines.

The liquid hydrocarbon fuels can contain conventionally added additives.

The process according to the invention is also suitable for defoaming and degassing, freshly delivered crude petroleum or crude oil and/or to prevent or reduce foaming when working up crude oil by distillation and in cracking processes in the refinery.

The process according to the invention is also suitable for defoaming and degassing lubricants and hydraulic oils as well as paints and varnishes, which contain synthetic resins dissolved in solvents.

Preferably, the organopolysiloxanes according to the invention are added to the organic systems in amounts of from 1.0 to 5,000 ppm by weight, preferably from 2.5 to 1,000 ppm by weight and in particular from 5 to 200 ppm by weight, in each case with respect to the total weight of the organic system. The organopolysiloxanes according to the invention are preferably added in the form of solutions. The organopolysiloxanes according to the invention are diluted with the solvents only so that they can be added more easily to the materials to be defoamed and/or degassed and can be better dispersed in the latter. Examples of solvents are ethoxypropyl acetate, ethyl glycol acetate, di-n-butyl oxalate, cyclohexanone and methyl isobutyl ketone.

The amount of organopolysiloxane according to the invention in the solutions is preferably from 2.5 to 80% by weight, with respect to the total weight of the solution. No further additives are required in order to render the organopolysiloxanes according to the invention effective as antifoams.

Preparation of the organopolysiloxanes (siloxane) 1 to 16

1.05 mol of the alkyne indicated in Table 1 are initially introduced under nitrogen and mixed with the amount of solvent indicated in Table 1. Platinum tetrachloride dissolved in 1-octene is added to this mixture in an amount such that, with respect to the total weight of all constituents of the reaction mixture, the reaction mixture contains 10 ppm by weight of platinum, calculated as the element. The organopolysiloxane containing Si-bonded hydrogen (H-siloxane) indicated in Table 1 is added at 125° C. in the course of 2 to 4 hours in an amount which corresponds to 1.0 g of Si-bonded hydrogen. The H-siloxane B has the following general formula:

$$HMe_2SiO(Me_2SiO)_{6.5}SiMe_2H \qquad (B)$$

whereas the H-siloxane C. has the following general formula

$$Me_3SiO(Me_2SiO)_m(MeHSiO)_nSiMe_3 \qquad (C)$$

in which Me is a methyl radical and m and n have the meaning indicated in Table 3. The reaction takes place within the period indicated in Table 1 up to the conversion of Si-bonded hydrogen indicated in Table 1 (unconverted Si-bonded hydrogen is determined volumetrically by liberation with KOH). Solvent and volatile constituents are removed by distillation at 100° C. and 14 hPa (abs.) in the course of 1 hour. The yield of the yellow to brown-colored organopolysiloxanes thus obtained is virtually quantitative. Organopolysiloxanes containing more than 30% by weight of $C_2H_4O$ groups can tend to turbidity.

The $^1$H NMR spectrum (CDCl$_3$) gives the following data for the organopolysiloxanes 2 to 6 and 8 to 16:

$\delta = 6.2$ppm (1H,

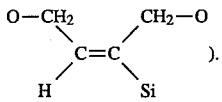

).

The $^1$HNMR spectrum for the organopolysiloxanes 1 and 7 is of more complex nature because of the formation of the two isomeric radicals A.

The alkyne

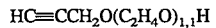

$$HC\equiv CCH_2O(C_2H_4O)_{1.1}H$$

used for the preparation of organopolysiloxanes 1 and 7 is available commercially under the tradename "Golpanol PME" from BASF. The alkyne

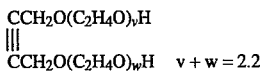

$$\begin{array}{l} CCH_2O(C_2H_4O)_vH \\ ||| \\ CCH_2O(C_2H_4O)_wH \end{array} \quad v+w = 2.2$$

which has 2.2 $C_2H_4O$ groups per molecule and is used for the preparation of organopolysiloxanes 4, 8, 10, 12, 13 and 16 is available commercially under the tradename "Golpanol BEO" from BASF. The alkyne

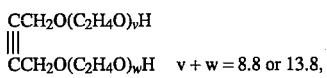

$$\begin{array}{l} CCH_2O(C_2H_4O)_vH \\ ||| \\ CCH_2O(C_2H_4O)_wH \end{array} \quad v+w = 8.8 \text{ or } 13.8,$$

which has 8.8 or 13.8 $C_2H_4O$ groups per molecule and which is used for the preparation of organopolysiloxanes 5 and 14 and, respectively, 9, 11 and 15 is prepared by reacting 2-butyne-1,4-diol with ethylene oxide, as described in Kirk-Othmer, Encyclopedia of Chemical Technology, 2nd Edition, Volume 10, page 638 et seq.

Organopolysiloxanes 4 to 16 have the following general formula:

$$Me_3SiO(Me_2SiO)_m(MeASiO)_nSiMe_3$$

TABLE 1

| Siloxane No. | Alkyne | v + w | Solvent | H-siloxane | Time (h) | Conversion (%) |
|---|---|---|---|---|---|---|
| 1 | $HC{\equiv}CCH_2O(C_2H_4O)_{1.1}H$ | — | 30 g toluene | B | 22 | 96 |
| 2 | 2-butyne-1,4-diol | — | 20 g toluene | B | 5 | 98 |
| 3 | 3-hexyne-2,5-diol | — | — | B | 6 | 99 |
| 4 | $CCH_2O(C_2H_4O)_vH$ 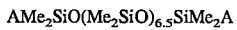 $CCH_2O(C_2H_4)_wH$ | 2.2 | 30 g toluene | C | 24 | 96 |
| 5 | " | 8.8 | 700 g EPA* | C | 8 | 92 |
| 6 | 2-butyne-1,4-diol | — | 600 g dioxane | C | 30 | 98 |
| 7 | $HC{\equiv}CCH_2O(C_2H_4O)_{1.1}H$ | — | 140 g EPA* | C | 20 | 99 |
| 8 | $CCH_2O(C_2H_4O)_vH$ 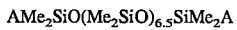 $CCH_2O(C_2H_4)_wH$ | 2.2 | 170 g EPA* | C | 21 | 98 |
| 9 | " | 13.8 | 1200 g EPA* | C | 20 | 85 |
| 10 | " | 2.2 | 200 g EPA* | C | 18 | 96 |
| 11 | " | 13.8 | 1200 g EPA* | C | 28 | 87 |
| 12 | " | 2.2 | 300 g EPA* | C | 24 | 97 |
| 13 | " | 2.2 | 300 g EPA* | C | 18 | 94 |
| 14 | " | 8.8 | 600 g EPA* | C | 24 | 88 |
| 15 | " | 13.8 | 1200 g EPA* | C | 20 | 93 |
| 16 | " | 2.2 | 170 g EPA* | C | 5 | 95 |

*EPA = ethoxypropyl acetate

EXAMPLES 1 TO 13

Organopolysiloxanes 1 to 3 have the following general formula:

$$AMe_2SiO(Me_2SiO)_{6.5}SiMe_2A$$

in which Me denotes a methyl radical and the radical A has the meaning indicated in Table 2. The molecular weight, the viscosity and the percentage by weight of oxyethylene groups, with respect to the total weight of the particular organopolysiloxane, are also indicated in Table 2.

in which Me denotes a methyl radical and A, m and n have the meaning indicated in Table 3. The molecular weight, the viscosity and the percentage by weight of oxyethylene groups, with respect to the total weight of the particular organopolysiloxane, are also indicated in Table 3.

TABLE 2

| Siloxane No. | A | Molecular weight g/mol | Viscosity (25° C.) mm²/s | % by weight of $C_2H_4O$ groups |
|---|---|---|---|---|
| 1 | $-CH{=}CHCH_2O(C_2H_4O)_{1.1}H$ and $H_2C{=}CCH_2O(C_2H_4O)_{1.1}H$ | 830 | 40 | 12 |
| 2 | $-CCH_2OH$ $\parallel$ $HCCH_2OH$ | 790 | 330 | 0 |
| 3 | $-CC(CH_3)HOH$ $\parallel$ $HCC(CH_3)HOH$ | 840 | 790 | 0 |

TABLE 3

| Siloxane No. | m | n | m:n | A | v + w | Molecular weight g/mol | Viscosity (25° C.) mm²/s | % by weight of $C_2H_4O$ groups |
|---|---|---|---|---|---|---|---|---|
| 4 | 11.6 | 8.4 | 1.38 | —CCH$_2$O(C$_2$H$_4$O)$_v$H ‖ HCCH$_2$O(C$_2$H$_4$O)$_w$H | 2.2 | 3060 | 4060 | 27 |
| 5 | " | " | " | " | 8.8 | 5500 | 200 | 59 |
| 6 | 35 | 11 | 3.18 | —CCH$_2$OH ‖ HCCH$_2$OH | 0 | 4360 | 14300 | 0 |
| 7 | " | " | " | —CH=CHCH$_2$O(C$_2$H$_4$O)$_v$H and H$_2$C=CCH$_2$O(C$_2$H$_4$O)$_w$H | v=w= 1.1 | 4580 | 880 | 12 |
| 8 | " | " | " | —CCH$_2$O(C$_2$H$_4$O)$_v$H ‖ HCCH$_2$O(C$_2$H$_4$O)$_w$H | 2.2 | 5420 | 3130 | 20 |
| 9 | " | " | " | " " | 13.8 | 11000 | 200 | 61 |
| 10 | 122 | 26 | 4.69 | —CCH$_2$O(C$_2$H$_4$O)$_v$H ‖ HCCH$_2$O(C$_2$H$_4$O)$_w$H | 2.2 | 15500 | 16330 | 16 |
| 11 | " | " | " | " " | 13.8 | 26500 | 470 | 60 |
| 12 | 35 | 5 | 7 | " | 2.2 | 3970 | 840 | 12 |
| 13 | 61 | 7 | 8.71 | " | 2.2 | 6380 | 1360 | 11 |
| 14 | " | " | " | " | 8.8 | 8400 | 480 | 32 |
| 15 | " | " | " | " | 13.8 | 9950 | 690 | 43 |
| 16 | 10 | 3 | 3.33 | " | 2.2 | 1470 | 400 | 20 |

The effectiveness of these organopolysiloxanes as antifoams for controlling the foaming of diesel fuel is determined with the aid of a test method which best simulates the tanking operation at a garage, the transfer of the diesel fuel from a tanker to the garage storage tank by pumping. The tests are carried out in accordance with DIN 51601 using an additive-free winter diesel fuel from DMP Mineralöl Petrochemie GmbH, D-8263 Burghausen.

In each case 7.5 ppm by weight or 15 ppm by weight of the particular organopolysiloxane indicated in Table 4, which is characterized in more detail in Table 2 or, respectively, 3, are added in the form of a 10% strength solution in ethoxypropyl acetate to, in each case, 250 g of diesel fuel and the mixture is then transferred to a 500 ml pressure vessel. The pressure vessel is rapidly closed and the outlet orifice (diameter of the outlet orifice=1 mm) is centered accurately above the center of a 500 ml measuring cylinder. The outlet orifice and the upper edge of the measuring cylinder are in one plane. The diesel fuel mixture is then run into the measuring cylinder under a constant compressed air pressure of 1 bar over a period of 6 seconds controlled by a timer. The foam/liquid volume in ml and the foam decomposition time in seconds are measured in each case. The foam decomposition time is ended when the entire liquid level of the diesel fuel is visible. A comparison test C1 without the presence of an antifoam is carried out as blank. The results are summarized in Table 4.

TABLE 4

| Example | Siloxane No. | Siloxane addition [ppm by weight] | Foam/liquid volume [ml] | Foam decomposition time [s] |
|---|---|---|---|---|
| 1 | 1 | 15 | 350 | 20 |
| 2 | 2 | 15 | 375 | 22 |
| 3 | 3 | 15 | 500 | 42 |
| 4 | 4 | 7.5 | 350 | 18 |
|   |   | 15 | 310 | 13 |
| 5 | 5 | 7.5 | 410 | 24 |
|   |   | 15 | 340 | 12 |
| 6 | 6 | 7.5 | 320 | 12 |
|   |   | 15 | 290 | 5 |
| 7 | 7 | 7.5 | 300 | 8 |
|   |   | 15 | 280 | 4 |
| 8 | 8 | 7.5 | 300 | 9 |
|   |   | 15 | 290 | 5 |
| 9 | 9 | 7.5 | 440 | 33 |
|   |   | 15 | 400 | 21 |
| 10 | 10 | 7.5 | 340 | 14 |
|   |   | 15 | 300 | 6 |
| 11 | 12 | 7.5 | 310 | 20 |
|   |   | 15 | 290 | 9 |
| 12 | 13 | 7.5 | 300 | 12 |
|   |   | 15 | 290 | 6 |
| 13 | 14 | 7.5 | 440 | 28 |
|   |   | 15 | 375 | 25 |
| C1 | — | — | 500 | 56 |

The results from Table 4 show that organopolysiloxanes 1 to 3 do have foam-preventing properties compared with the blank C1 but otherwise are relatively poor antifoams.

In addition, it can be seen from the results from Table 4 that organopolysiloxanes 6, 7, 8, 10, 12 and 13 are very effective as antifoams. Organopolysiloxane 4 has limited effectiveness as an antifoam, whilst the suitability of organopolysiloxanes 5, 9 and 14 as antifoams is poor.

EXAMPLES 14 TO 18

In each case 100 ml of crude oil (dead crude oil) from the Statfjord field (obtainable from Statoil, delivered in spring 1990) and the amount of organopolysiloxane indicated in Table 5, which organopolysiloxane is characterized in more detail in Table 3, in the form of a 10% strength solution in ethoxypropyl acetate are initially introduced into a 1 l gas autoclave which has a laterally fitted outlet line (diameter of the outlet line=4 mm) and is provided with a vane stirrer, a manometer, a pressure relief valve and a thermometer and can be temperature-controlled. After thermostat adjustment of the temperature to 40° C., the mixture thus obtained is saturated with methane gas at 250 revolutions/minute for a period of 10 minutes under a pressure of $8.10^5$ Pa. Crude oil saturated with methane gas is then run into a 250 ml measuring cylinder via a reversible valve. The operation for letting down the pressure is ended at a residual pressure of $1.10^5$ Pa and the reversible valve is actuated again. The foam/liquid volume in ml and the foam decomposition time in seconds are measured in each case. The foam decomposition time is ended when the entire liquid level of the crude oil mixture is visible. A comparison test C2 without the presence of an antifoam is carried out as blank. The results are summarized in Table 5.

TABLE 5

| Example | Siloxane No. | Siloxane addition [ppm by weight] | Foam/liquid volume [ml] | Foam decomposition time [s] |
|---|---|---|---|---|
| 14 | 4 | 100 | 103 | 8 |
| 15 | 5 | 100 | 187 | 37 |
| 16 | 6 | 100 | 105 | 10 |
| 17 | 8 | 50 | 115 | 19 |
|  |  | 75 | 105 | 9 |
|  |  | 100 | 103 | 7 |
| 18 | 9 | 100 | 173 | 56 |
| C2 | — | — | 189 | 98 |

EXAMPLES 19 TO 22

The procedure described in Examples 14 to 18 is repeated except that crude oil from the Oseberg field (obtainable from Norsk-Hydro, delivered in spring 1990) is used in place of the crude oil from the Statfjord field. A comparison test C3 without the presence of an antifoam is carried out as blank. The results are summarized in Table 6.

TABLE 6

| Example | Siloxane No. | Siloxane addition [ppm by weight] | Foam/liquid volume [ml] | Foam decomposition time [s] |
|---|---|---|---|---|
| 19 | 5 | 50 | 173 | 65 |
| 20 | 6 | 50 | 103 | 8 |
| 21 | 8 | 10 | 162 | 19 |
|  |  | 25 | 109 | 10 |
|  |  | 50 | 103 | 7 |
| 22 | 9 | 50 | 173 | 65 |
| C3 | — | — | 183 | 92 |

We claim:

1. A process for defoaming and/or degassing organic systems which comprises adding an antifoam containing organopolysiloxane to the organic system, in which the organopolysiloxane contains siloxane units of the general formulas $$R_a SiO_{\frac{4-a}{2}} \quad (I)$$

and $$R_b A_c SiO_{\frac{4-(b+c)}{2}} \quad (II)$$

in which R represents a monovalent hydrocarbon radical having from 1 to 18 carbon atoms per radical, A represents a radical of the general formula $$-CH_{1-x}[R^1O(R^2O)_vH]_x$$
$$\phantom{-C}\|$$
$$CH_{2-y}[R^1O(R^2O)_wH]_y$$

in which $R^1$ represents a radical of the formula $-CR^3H-$, where $R^3$ is a hydrogen atom or a monovalent organic radical, $R^2$ represents a radical of the formula, $-CR^4H-CH_2-$ or $-CH_2CH_2CH_2-$, where $R^4$ is a hydrogen atom or a monovalent organic radical, v and w are each 0 or an integer, the sum of v+w being 0 to 16, and x and y are each 0 or 1, the sum of x+y being 1 or 2, a is 1, 2 or 3, b is 0, 1 or 2 and c is 1 or 2, and the sum of b+c is not greater than 3.

2. The process of claim 1, wherein the organopolysiloxane has the general formula $$R_3SiO(R_2SiO)_m(RASiO)_nSiR_3 \quad (III)$$

in which the ratio of m:n is in the range of from 1:1 to 25:1, R represents a monovalent hydrocarbon radical having from 1 to 18 carbon atoms per radical, A represents a radical of the general formula $$-CH_{1-x}[R^1O(R^2O)_vH]_x$$
$$\phantom{-C}\|$$
$$CH_{2-y}[R^1O(R^2O)_wH]_y$$

in which $R^1$ represents a radical of the formula $-CR^3H-$ where $R^3$ is a hydrogen atom or a monovalent organic radical, $R^2$ represents a radical of the formula $-CR^4H-CH_2-$ or $-CH_2CH_2CH_2-$, where $R^4$ is a hydrogen atom or a monovalent organic radical, v and w are each 0 or an integer, the sum of v+w being 0 to 16, and x and y are each 0 or 1, the sum of x+y being 1 or 2, a is 1, 2 or 3, b is 0, 1 or 2 and c is 1 or 2, and the sum of b+c is not greater than 3.

3. The process of claim 2, wherein the ratio of m:n is in the range of from 1:1 to 10:1.

4. The process of claim 1, wherein the $R^2O$ groups are present in an amount of from 0 to less than 30% by weight based on the calculated molecular weight of the organopolysiloxane.

5. The process of claim 1, wherein the $R^2O$ groups are present in an amount of from 0 to less than 25% by weight based on the calculated molecular weight of the organopolysiloxane.

6. The process of claim 1, wherein the sum of v+w is from 0 to 8.

7. The process of claim 1, wherein the sum of v+w is from 0 to 4.

8. The process of claim 1, wherein $R^1$ represents a methylene radical and $R^2$ represents an ethylene radical.

9. The process of claim 1, wherein the organic systems are liquid hydrocarbons or compositions containing liquid hydrocarbons.

* * * * *